United States Patent [19]

Dejmek et al.

[11] Patent Number: 5,068,898
[45] Date of Patent: Nov. 26, 1991

[54] VOICE MESSAGING METHOD FOR SELECTIVE CALL RECEIVERS

[75] Inventors: James W. Dejmek, Lombard, Ill.; Ronald A. Craig, Boynton Beach, Fla.

[73] Assignee: Motorola, Inc., Schaumburg, Ill.

[21] Appl. No.: 456,430

[22] Filed: Dec. 26, 1989

[51] Int. Cl.$^5$ ............................................. G10L 5/00
[52] U.S. Cl. ............................................. 381/29; 360/8
[58] Field of Search ............................. 381/29–47; 360/8

[56] References Cited

U.S. PATENT DOCUMENTS

| B 262,287 | 1/1975 | Yoshino | 360/8 |
| 3,646,441 | 2/1972 | Magnuski | 325/13 |
| 4,495,647 | 1/1985 | Burke et al. | 455/38 |
| 4,550,425 | 10/1985 | Anderson et al. | 381/30 |
| 4,742,514 | 5/1988 | Goode et al. | 370/109 |
| 4,754,450 | 6/1988 | Lynk, Jr. et al. | 370/29 |
| 4,839,923 | 6/1989 | Kotzin | 381/31 |

Primary Examiner—Emanuel S. Kemeny
Attorney, Agent, or Firm—William E. Koch; Vincent B. Ingrassia; Anthony J. Sarli, Jr.

[57] ABSTRACT

Accelerated throughput of voice messages is accomplished by first filtering a normal 50–3000 Hz voice signal to a reduced bandwidth 350–1650 Hz (with loss of identifying features), the reduced signal then accelerated X3 and translated downward to bandwidth 50–3950 Hz for transmission. The receiver recovers the 350–1650 Hz signal.

22 Claims, 3 Drawing Sheets

VOICE MESSAGING METHOD FOR SELECTIVE CALL RECEIVERS

FIELD OF THE INVENTION

This invention relates in general to selective call systems with voice message capability and, more specifically, to a method of accelerating voice messaging to allow the transmission of more voice messages per unit time.

BACKGROUND OF THE INVENTION

Convention selective call systems comprise messaging capabilities such as voice, numeric, and alphanumeric. In typical voice messaging, a recorded voice is applied as analog modulation to a radio frequency signal. Numeric and alphanumeric messaging typically comprise the application of digital data at a predetermined rate to a radio frequency signal. As technological advances in hardware design facilitate higher data rates to maximize system throughput for numeric and alphanumeric messaging, convention voice messaging becomes relatively less efficient. A known approach to overcome this efficiency difficulty involves accelerating voice messages to increase throughput. A problem arises with this approach, however, because accelerating voice messages requires expansion of the system bandwidth, which existing paging systems can generally not support.

Thus, what is needed is an improved method of accelerating voice messaging in a selective call system without introducing a message bandwidth that is incompatible with existing systems.

SUMMARY OF THE INVENTION

Briefly, according to the invention, a method comprises the steps, in a selective call system, of time-compressing a voice message, translating the frequency spectrum of the voice message, transmitting the voice message, receiving the voice message, reverse translating the frequency spectrum of the voice message, and time-expanding the voice message. The efficiency of voice messaging is thereby improved relative to convention selective call systems while maintaining compatibility with the bandwidth of the convention systems.

DETAILED DESCRIPTION OF THE INVENTION

Figure 1:
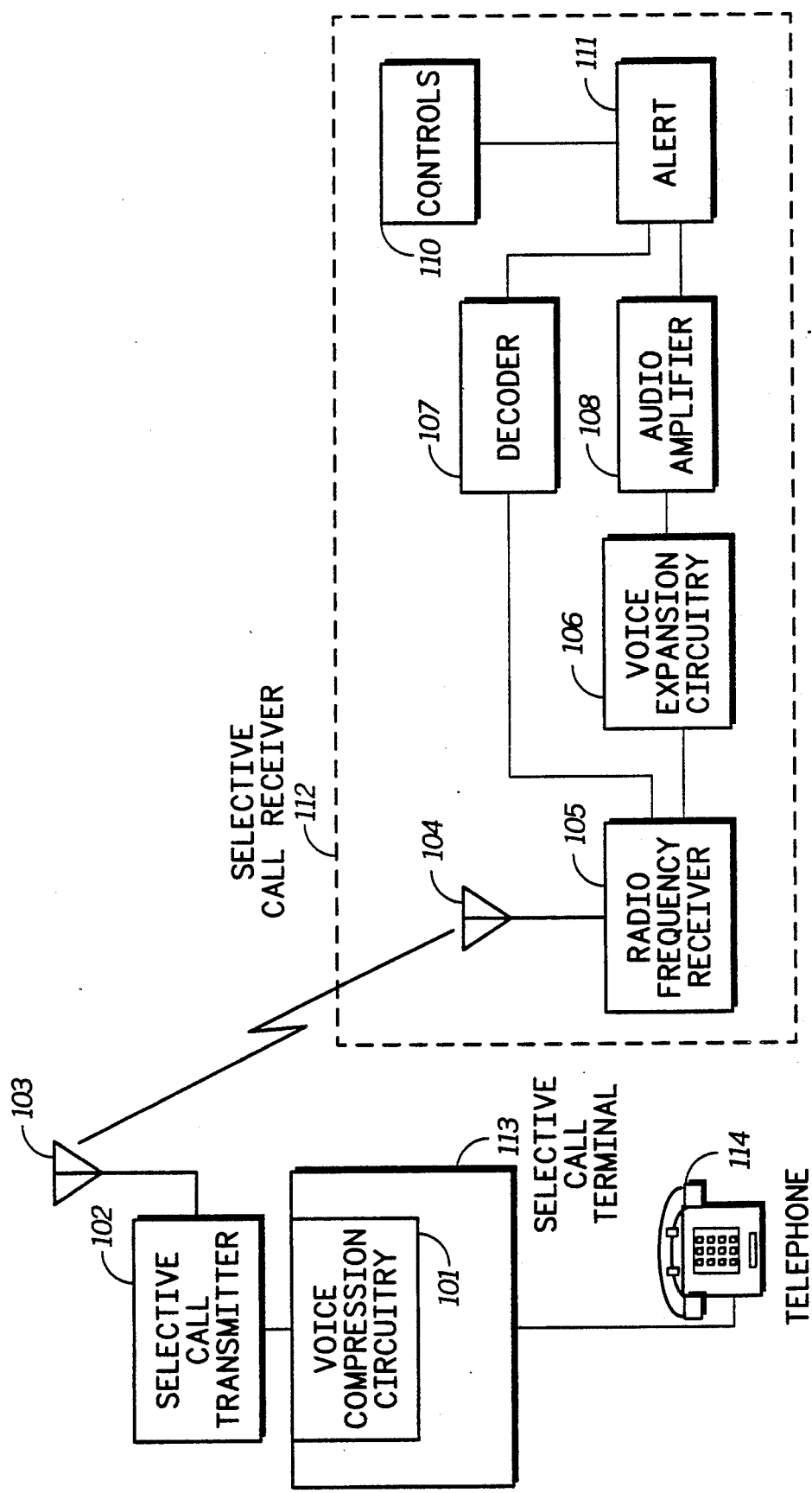
FIG. 1 is a block diagram of a selective call system in accordance with the present invention.

Referring to FIG. 1, a block diagram of the selective call system of the present invention comprises a telephone 114 from which selective calls are initiated for transmission to selective call receivers in the system. Each selective call entered through the telephone 114 typically comprises (a) a receiver address of at least one of the selective call receivers in the system and (b) a voice message. The initiated selective calls are provided to a selective call terminal 113 for formatting and queuing. A voice compression circuitry 101 of the paging terminal 113 serves to compress the time length of the provided voice message (the detailed operation of the voice compression circuitry 101 is discussed in the following description of FIG. 2). The selective call is then input to the selective call transmitter 102 where it is applied as modulation to a radio frequency signal which is sent over the air through an antenna 103.

An antenna 104 within a selective call receiver 112 receives the modulated, transmitted radio frequency signal from the air and inputs it to a radio frequency receiver 105, where the radio frequency signal is demodulated and the receiver address and the compressed voice message modulation are recovered. The compressed voice message is then provided to a voice expansion circuitry 106 where the time length of the voice message is expanded to its original value (the detailed operation of the voice expansion circuitry 106 is discussed in the following description of FIG. 3). The voice message is then provided to an audio amplifier 108 for the purpose of amplifying it to an audible level.

The demodulated receiver address is supplied from the radio frequency receiver 105 to a decoder 107. If the receiver address matches any of the receiver addresses stored in the decoder 107, an alert 111 is activated, providing a brief sensual indication to the user of the selective call receiver 112 that a selective call has been received. The brief sensual indication may comprise an audible signal, a tactile signal such as a vibration, or a visual signal such as a light, or a combination thereof. The amplified voice message is then furnished from the audio amplifier 108 to an audio loudspeaker within the alert 111 for message announcement and review by the user.

The decoder 107 may comprise a memory in which the received voice messages can be stored and recalled repeatedly for review by actuation of one or more controls 110.

Figure 2:
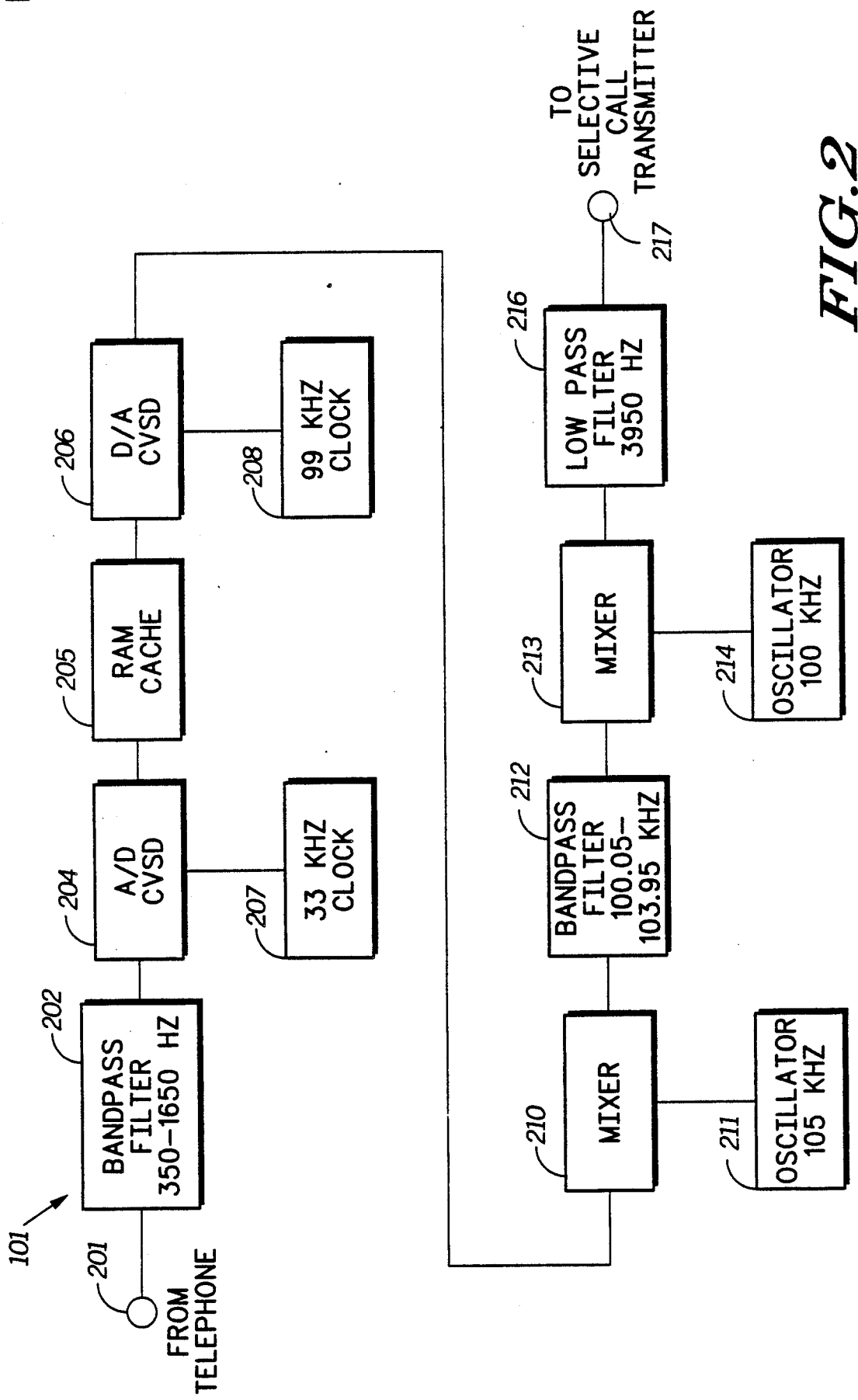
FIG. 2 is a block diagram of a voice compression circuit in accordance with the present invention.

Referring to FIG. 2, a block diagram of the voice compression circuitry, generally shown at 101, comprises a node 201, through which voice messages enter from the telephone 114. The voice messages are provided to a bandpass filter 202 which is designed to pass selected frequencies between 350 hz and 1650 hz to a analog-todigital continuously-varying slope delta modulator (A/D CVSD) 204 which, in conjunction with a 33 khz clock 207, samples, digitizes, and stores the voice message in a random access memory (RAM) cache 205 at a first rate. The stored digitized message is then retrieved from the RAM cache 205 at a second rate by a digital-to-analog continuously-varying slope delta modulator (D/A CVSD) 206 in conjunction with a 99 khz clock 208 to provide an analog signal comprising frequency components in the 1050 to 4950 hz range (accelerated voice messages).

The frequency spectrum of the 1050 to 4950 hz signal is then translated downward as follows to maintain compatibility with typical existing selective call systems which can support voice message frequencies up to approximately 4000 hz.

The 1050 to 4950 hz signal is supplied to a mixer 210 where it is mixed with a 105 khz signal from an oscillator 211, whereby supplying a signal with frequency components in the 100.05 to 103.95 khz range to a bandpass filter 212. The bandpass filter 212 is designed such that it passes frequencies in the 100.5 to 103.95 khz range to a mixer 213. In the mixer 213, the 100.5 to 103.95 khz signal is mixed with a 100 khz signal from the oscillator 214, whereby furnishing a signal with frequency components in the 50 to 3950 hz range to a low pass filter 216, the cutoff frequency of which is 3950 hz. A filtered 50-3950 hz signal is thereby provided at a node 217, from which the signal is supplied to the selective call transmitter 102.

The frequencies noted for the bandpass filter 202, the 33 khz clock 207, the 99 khz clock 208, the oscillator 211, the bandpass filter 212, the oscillator 214, and the lowpass filter 216 are merely suggested for the present invention. Other frequencies may be used equally well.

Time-compressed voice messages comprising a frequency spectrum that is compatible with existing selective call systems are thus generated in FIG. 2.

Figure 3:
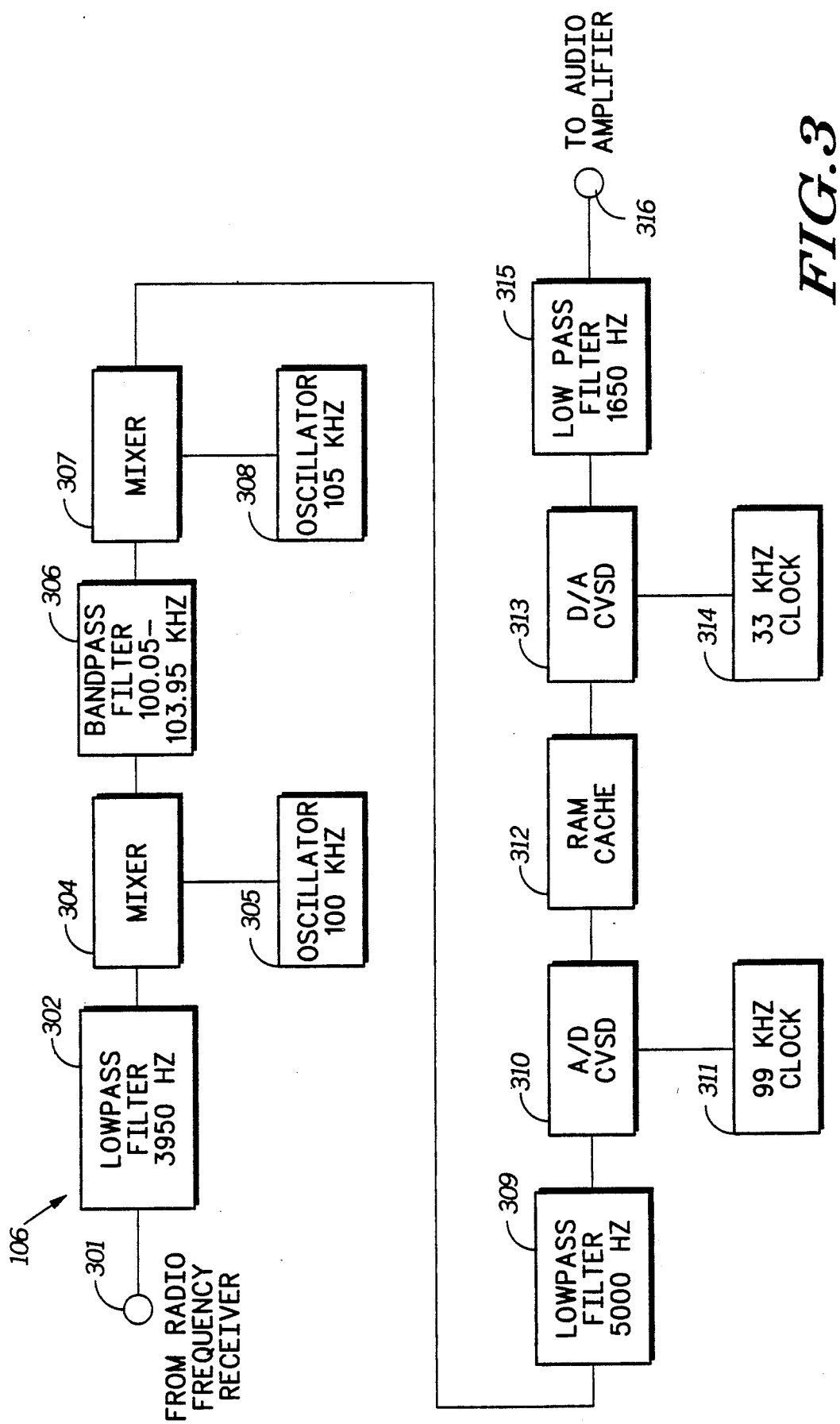
FIG. 3 is a block diagram of a voice expansion circuit in accordance with the present invention.

Referring to FIG. 3, a block diagram of the voice expansion circuitry, generally shown at 106, comprises a node 301 through which a 50-3950 hz signal from the radio frequency receiver 112 is provided to a low pass filter 302, resulting in a filtered 50-3950 hz signal being furnished to a mixer 304. The 50-3950 hz signal is mixed in the mixer 304 with a 100 khz signal supplied by an oscillator 305, whereby furnishing a signal comprised of frequency components in the 100.05 to 103.95 khz range to a bandpass filter 306. The bandpass filter 306 is designed to pass frequencies in the 100.05 to 103.95 khz range to a mixer 307. In the mixer 307, the 100.05 to 103.95 khz signal is mixed with a 105 khz signal provided by an oscillator 308, whereby furnishing a 1050 to 4950 hz signal to a low pass filter 309, the cut-off frequency of which is -5000 hz. The aforegoing step of translating the frequency spectrum (in FIG. 2) is thus reversed. The filtered 1050 to 4950 hz signal is then supplied to an A/D CVSD which, in conjunction with a 99 khz clock 311, samples, digitizes, and stores the signal in a RAM cache 312. The stored digitized signal is then retrieved from the RAM cache 312 and supplied to a D/A CVSD 313 by a 33 khz clock 314, yielding an analog 350-1650 hz decelerated voice message at the input of a 1650 hz lowpass filter 315, whereby providing a filtered 350-1650 hz signal at a node 316 for input to the audio amplifier 108.

The frequencies noted for the low pass filter 302, the oscillator 305, the bandpass filter 306, the oscillator 308, the low pass filter 309, the 99 khz clock 311, the 33 khz clock 314, and the low pass filter 315 are merely suggested for the present invention. Other frequencies may be used equally well.

The time-compressed, frequency-translated voice messages are thus reverse-translated and time-expanded in FIG. 3.

We claim:

1. A method comprising the steps of:
   (a) time-compressing a voice message; and
   (b) translating the frequency spectrum of said voice message.

2. The method according to claim 1 wherein said time-compressing step comprises sampling and storing said voice message at a first rate and retrieving said voice message at a second rate.

3. The method according to claim 2 wherein said translating step comprises translating the frequency spectrum of said voice message downward.

4. The method according to claim 3 wherein said first rate is less than said second rate and said frequency spectrum is translated from substantially between 1050 hz and 4950 hz to substantially between 50 hz and 3950 hz.

5. The method according to claim 1 further comprising the steps of:

(c) reverse translating the frequency spectrum of said voice message; and
   (d) time-expanding said voice message.

6. The method according to claim 5 wherein said translating step comprises mixing said voice message with a signal to translate the frequency spectrum of said voice message from substantially between 1050 hz and 4950 hz downward to substantially between 50 hz and 3950 hz and said reverse translating step comprises mixing said voice message with a signal to translate the frequency spectrum of said voice message upward from substantially between 50 hz and 3950 hz to substantially between 1050 hz and 4950 hz.

7. The method according to claim 5 wherein said time-compressing step comprises sampling and storing said voice message at a first rate and retrieving said voice message at a second rate.

8. The method according to claim 5 wherein said time-expanding step comprises sampling and storing said voice message at a third rate and retrieving said voice message at a fourth rate.

9. The method according to claim 8 wherein said first rate is substantially equal to said fourth rate and said second rate is substantially equal to said third rate.

10. An apparatus for processing selective call messages, said apparatus comprising:
    a time-compression means for time-compressing selective call messages; and
    a frequency translation means for translating the frequency spectrum of said selective call messages.

11. The apparatus according to claim 10 wherein said selective call messages comprise voice messages.

12. The apparatus according to claim 11 wherein said time-compression means comprises a first clock for sampling said voice messages at a first rate to provide sampled voice messages, a memory for storing said sampled voice messages, and a second clock for retrieving said sampled voice messages from said memory at a second rate.

13. The apparatus according to claim 11 wherein said frequency translation means comprises a mixer for mixing said voice messages with a signal to translate the frequency spectrum of said voice messages from substantially between 1050 hz and 4950 hz to substantially between 50 hz and 3950 hz.

14. The apparatus of claim 11, further comprising a reverse frequency translation means for reverse translating the frequency spectrum of said voice messages.

15. The apparatus of claim 14, further comprising a time-expansion means for expanding said voice messages.

16. The apparatus according to claim 15 wherein said frequency translation means comprises a mixer for mixing said voice messages with a signal to translate the frequency spectrum of said voice messages from substantially between 1050 hz and 4950 hz to substantially between 50 hz and 3950 hz and said reverse frequency translation means comprises a mixer for mixing said voice messages with a signal to translate the frequency spectrum of said voice messages from substantially between 50 hz and 3950 hz to substantially between 1050 hz and 4950 hz.

17. The apparatus according to claim 15 wherein said time-compression means comprises a first clock for sampling said voice messages at a first rate to provide sampled voice messages, a first memory for storing said sampled voice messages, and a second clock for retrieving said sampled voice messages from said first memory at a second rate and said time-expansion means comprises a third clock for sampling said voice messages at a third rate to provide sampled voice messages, a second memory for storing said sampled voice messages, and a fourth clock for retrieving said sampled voice messages from said second memory.

18. The apparatus according to claim 17 wherein said first rate is substantially equal to said fourth rate and said second rate is substantially equal to said third rate.

19. An apparatus comprising:
receiver means for receiving a first signal, said first signal comprising voice messages;
frequency translation means for translating the frequency spectrum of said voice messages; and
time expansion means for time-expanding said voice messages.

20. The apparatus according to claim 18 wherein said receiver means comprises a selective call receiver.

21. The apparatus according to claim 19 wherein said frequency translation means comprises a mixer for mixing said voice messages with a second signal to translate the frequency spectrum of said voice messages.

22. The apparatus of claim 19 wherein said time expansion means comprises a first clock for sampling said voice messages at a first rate to provide sampled voice messages, a memory for storing said sampled voice messages, and a second clock for retrieving said sampled voice messages from said memory.

* * * * *